(12) United States Patent  
Vincent et al.

(10) Patent No.: US 9,353,787 B2  
(45) Date of Patent: May 31, 2016

(54) CRANKSHAFT BEARING CAP WITH OPTIMIZED PILLARS

(75) Inventors: Franck Vincent, Saint Maur des Fosses (FR); Didier Miazga, Taverny (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/129,406

(22) PCT Filed: Mar. 13, 2012

(86) PCT No.: PCT/FR2012/050513  
§ 371 (c)(1),  
(2), (4) Date: Dec. 26, 2013

(87) PCT Pub. No.: WO2013/001181  
PCT Pub. Date: Jan. 3, 2013

(65) Prior Publication Data  
US 2014/0133791 A1     May 15, 2014

(30) Foreign Application Priority Data  
Jun. 27, 2011   (FR) ...................................... 11 55708

(51) Int. Cl.  
*F16C 9/02*     (2006.01)  
*F16C 35/00*    (2006.01)

(52) U.S. Cl.  
CPC . *F16C 9/02* (2013.01); *F16C 35/00* (2013.01); *F16C 2326/28* (2013.01); *F16C 2360/22* (2013.01)

(58) Field of Classification Search  
CPC .............. F16C 9/02; F16C 9/03; F16C 35/00; F16C 2326/28; F16C 2360/22; F16C 9/00–9/06

USPC .................................. 384/288, 294, 428–437  
See application file for complete search history.

(56) References Cited

U.S. PATENT DOCUMENTS 118,647 A * 8/1871 Sargent ......................... 384/434  
752,349 A * 2/1904 Martin et al. ................... 384/30

(Continued)

FOREIGN PATENT DOCUMENTS

FR          2 878 588        6/2006  
WO     WO 2007/033139 A2    3/2007

OTHER PUBLICATIONS

International Search Report issued Jun. 5, 2012, in PCT/FR12/050513 filed Mar. 13, 2012.

(Continued)

*Primary Examiner* — Alan B Waits  
(74) *Attorney, Agent, or Firm* — Oblon, McClelland, Maier & Neustadt, L.L.P

(57) ABSTRACT

A crankshaft bearing cap in a shape of a half-cylinder of axis X coinciding with the axis of the crankshaft and including diametrically opposed attachment pillars, each column-shaped pillar including a substantially oval upper surface incorporating a bearing surface surrounding a borehole through which a fixing screw can pass and a bearing surface for a screw head, the surface surrounding the borehole, and each attachment pillar further including at least two lateral and vertical grooves over a portion of the height of the pillar, the grooves being situated outside a vertical bearing cylinder having a base equal to the bearing surface and outside of a volume defined by the transverse plane passing through the axes of the attachment holes and extending symmetrically in the X-direction over a length.

8 Claims, 3 Drawing Sheets

(56) References Cited

U.S. PATENT DOCUMENTS

| | | | | |
|---|---|---|---|---|
| 1,126,888 | A * | 2/1915 | Seaman | 403/163 |
| 1,410,058 | A * | 3/1922 | Gentzel | 384/432 |
| 1,764,672 | A * | 6/1930 | Austin | 384/432 |
| 2,407,928 | A * | 9/1946 | Herreshoff et al. | 411/366.1 |
| 2,473,096 | A * | 6/1949 | Hamill et al. | 384/430 |
| 2,997,347 | A * | 8/1961 | Bauer | 384/432 |
| 3,893,734 | A * | 7/1975 | Ulbrich | 384/420 |
| 4,199,202 | A * | 4/1980 | Maeda | 384/432 |
| 4,693,216 | A * | 9/1987 | Ampferer et al. | 123/195 R |
| 4,705,092 | A * | 11/1987 | Ito et al. | 164/34 |
| 6,666,582 | B2 * | 12/2003 | Benini et al. | 384/433 |
| 6,926,444 | B2 * | 8/2005 | Rengmyr | 384/433 |
| 7,322,750 | B1 * | 1/2008 | Besselman | 384/432 |
| 7,384,196 | B2 * | 6/2008 | Binder et al. | 384/434 |
| 7,695,823 | B2 * | 4/2010 | Wakade | 428/548 |
| 7,753,592 | B2 * | 7/2010 | Neto | 384/432 |
| 8,327,817 | B2 * | 12/2012 | Palazzolo et al. | 123/195 R |
| 8,690,440 | B2 * | 4/2014 | Mochida | 384/432 |
| 2003/0118261 | A1 * | 6/2003 | Rengmyr | 384/434 |
| 2004/0264822 | A1 * | 12/2004 | Binder et al. | 384/429 |
| 2007/0081750 | A1 | 4/2007 | Neto | |
| 2010/0180853 | A1 * | 7/2010 | Palazzolo et al. | 123/195 R |
| 2013/0163906 | A1 * | 6/2013 | Hoshikawa et al. | 384/432 |
| 2013/0170774 | A1 * | 7/2013 | Mochida | 384/91 |

OTHER PUBLICATIONS

French Preliminary Search Report issued Jan. 26, 2012, in French 1155708 filed Jun. 27, 2011.

* cited by examiner

CRANKSHAFT BEARING CAP WITH OPTIMIZED PILLARS

RELATED TECHNICAL FIELD

The present invention relates to crankshaft bearing caps and more particularly to the fixing of these bearing caps.

The invention also relates to internal combustion engines having a crankshaft the axis of which is surrounded by a bearing and a bearing cap.

THE PRIOR ART

The crankshaft bearing cap is subjected to high stresses, especially in the zone located close to the fixing pillars of the bearing cap and level with said pillars themselves, which stresses can generate incipient cracks and lead to failure of the part and consequently of the engine. It is therefore necessary to reinforce said cap and to increase its resistance to fatigue. Since the part has been produced by cast iron casting, this generally has the result of increasing the mass of the bearing cap and to some extent that of the pillars, which runs counter to efforts to reduce the mass of every component in order to reduce the energy consumption of the engine and/or the vehicle, or has the result of favoring costlier materials for casting said bearing cap.

The publication FR2878588 B1 discloses a crankshaft bearing cap having a semi-cylindrical form the axis of which coincides with that of the crankshaft, which bearing cap has a convex outer surface and a fixing pillar at each of its ends, the connecting zone connecting the outer surface of the semi-cylinder and said fixing pillars being optimized from the geometrical point of view in order to improve fatigue resistance while reducing mass. The document does not disclose any rule governing the implementation of the fixing pillar.

The publication U.S. Pat. No. 7,384,196 B2 discloses a crankshaft bearing cap having a semi-cylindrical form surmounted by a cylindrical rib portion and having at each of its ends a fixing pillar substantially cylindrical in form which is attached to the semi-cylinder by a brace, the cross section of the semi-cylinder and that of said brace being optimized geometrically. The document does not disclose any rule governing the implementation of the fixing pillar.

OBJECT OF THE INVENTION

An objective of the invention is to optimize the shape of the pillars of the bearing cap, and it is the object of the invention to provide a bearing cap having a semi-cylindrical form and having diametrically opposed fixing pillars with an optimized profile, reducing the mass of the pillars while improving the fatigue resistance of the bearing cap.

The crankshaft bearing cap has a semi-cylindrical form and has at each end a fixing pillar in the form of a substantially oval column slightly widened at its base and having at least two lateral grooves over at least a portion of the height of the pillar. Said grooves reduce the mass of the fixing pillars and contribute to improving their fatigue resistance.

According to the invention, the fixing pillars have at least two grooves disposed outside a vertical support cylinder the base of which is equal to the support surface of the screw head, and outside a volume defined by the transverse plane passing through the axes of the fixing holes and extending symmetrically in the direction X over a length e. The fatigue resistance values are advantageously preserved or improved.

The grooves advantageously start from the base of the pillar and extend over at least a portion of the height of the pillar. A surface at the base of the pillar is thus advantageously opened up.

The grooves are advantageously formed symmetrically with respect to a transverse vertical median plane passing through the fixing axis. The manufacturing process is made more reliable.

The profile of the grooves varies from their lower end to their upper end. The depth dimension of the groove may vary from the lower end to the upper end of the groove.

The grooves are advantageously formed during the casting of the bearing cap.

Other aspects of the invention will be presented in the following description with regard to the appended drawings, which description is given by way of non-limiting example solely for the purpose of a good understanding of the invention and of how it may be implemented.

DESCRIPTION OF EMBODIMENTS OF THE INVENTION

The following descriptions make reference to the longitudinal axis X coinciding with the axis of the crankshaft, the transverse axis Y and the vertical axis Z.

Like parts appearing in different figures retain the same reference symbols.

Figure 1:
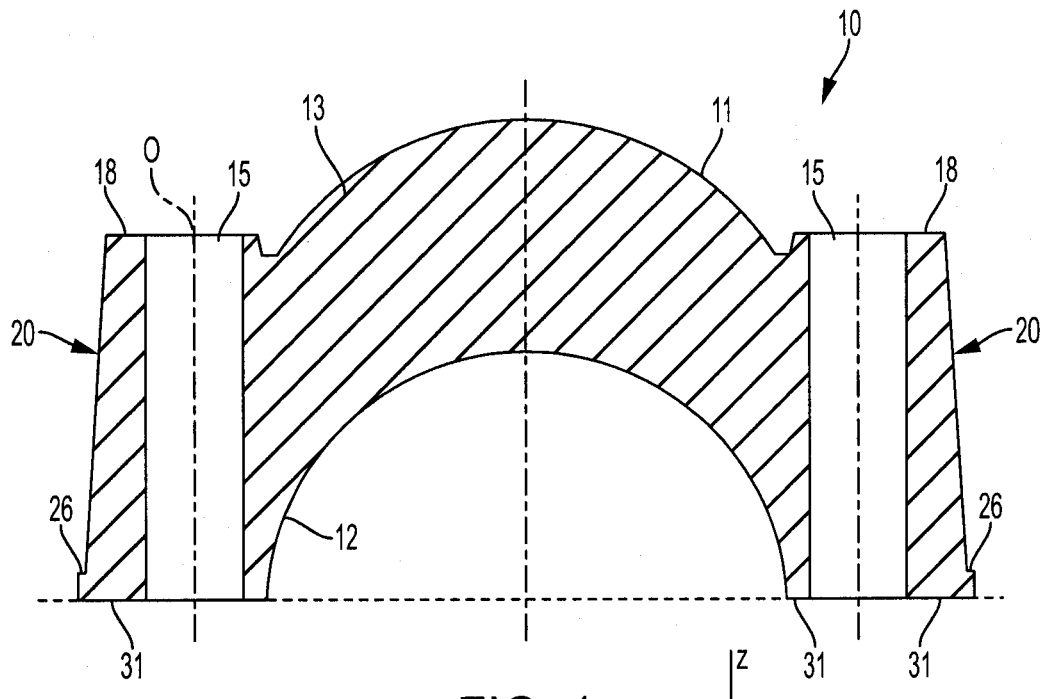
FIG. 1 is a sectional view of the crankshaft bearing cap along the section AA of FIG. 3.
Figure 2:
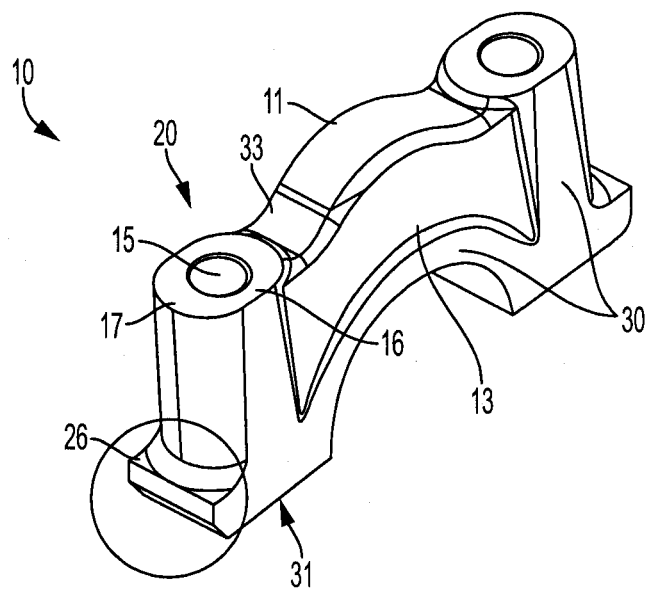
FIG. 2 is a perspective view of a bearing cap of the prior art.

FIG. 1 shows a sectional view of a bearing cap 10 according to the prior art which has a semi-cylindrical form 13 with an upper outer surface 11 and a lower inner surface 12 designed to be in contact with the crankshaft (not shown), said cylindrical form including two diametrically opposed fixing pillars 20. Each fixing pillar is in the form of a column and is supported on a substantially parallelepipedic base portion 26.

The bearing cap is produced essentially as a cast iron casting in a cluster or individually. Casting in clusters involves producing all the bearing caps in one piece, the number of bearing caps being equal to the number of cylinders of the engine plus one, for a given single engine. The part resulting from demolding therefore comprises a plurality of bearing caps juxtaposed along a transverse side and is subsequently divided to obtain the series of bearing caps. The bearing cap may also be produced individually by cast iron casting.

The mold comprises a first sand mold for the outer shape, producing the outer surface 11 of the cap, and a second mold for the inner shape, producing the internal surface of the cap comprising the lower surface 12 of the semi-cylindrical form of the bearing cap extended by the inner surface of the pillars and of the substantially parallelepipedic base portion. After demolding, the bearing cap undergoes machining to produce the lateral faces 30, the upper outer surface 11 of the pillar, the lower surface 31 of the pillar designed to be in contact with an element of a crankcase (not shown) or of a bearing foot (not shown), through-holes 15 for fixing screws (not shown) and the semi-cylindrical recess 12 adapted to surround a part of the crankshaft axis.

The pillar is generally tapered in shape in order to facilitate demolding of the bearing cap.

Figure 3:
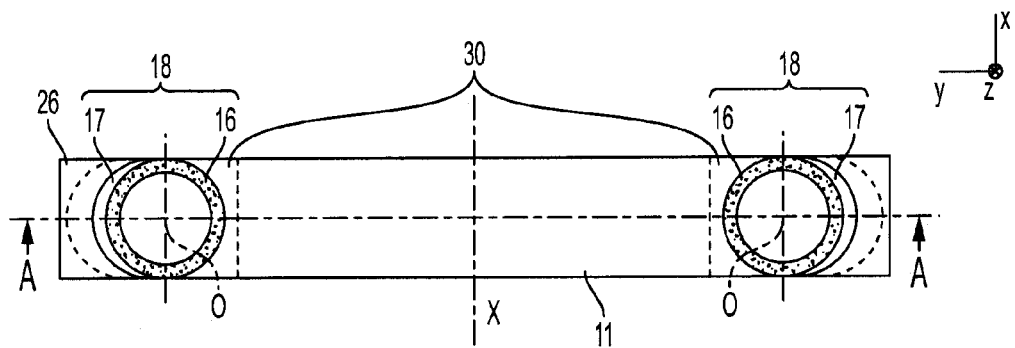
FIG. 3 is a top view of the bearing cap.
Figure 4:
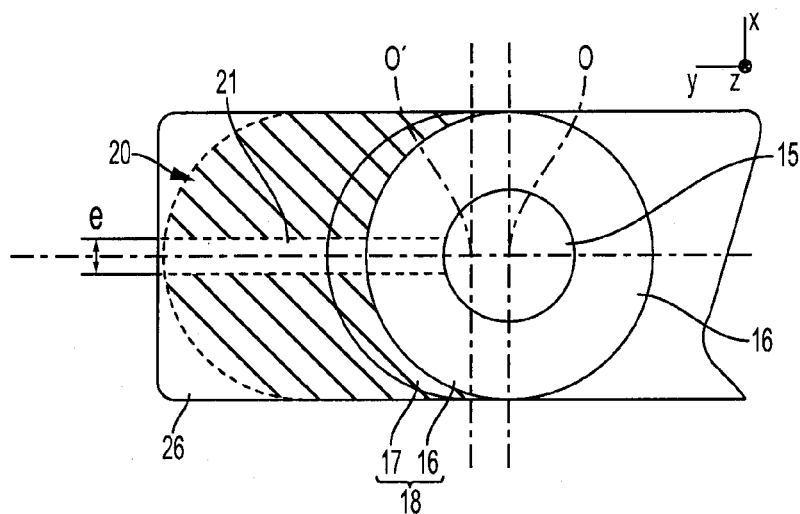
FIG. 4 is a top view of an end of the bearing cap of the prior art.
Figure 5:
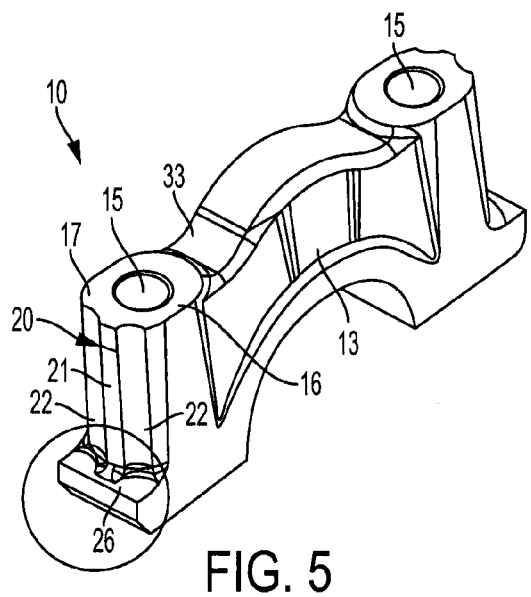
FIG. 5 is a perspective view of a bearing cap according to the invention.

FIGS. 3 to 5 show a bearing cap according to the invention, including a substantially oblong upper pillar surface 18. A circular opening 15 passes through the pillar along the vertical axis Z to allow the fixing screw to pass through; the axis of the hole thus formed passes through the center O of a circular surface 16 provided for contact with the head of the fixing screw and designated the support surface. The upper surface 18 may be broken down into the support surface 16 and a second surface 17, the two end circles of which, having the same radius and having the centers O and O', intersect, the distance between the two centers being a few millimeters. The circular surface 17 is offset on the transverse axis Y toward the free end of the pillar with respect to the support surface 16. The additional mass generated by the second circular surface 17 contributes to improving the fatigue resistance of the bearing cap 10.

According to the invention, two grooves 22, 23 are produced on the lateral outer surface of the pillar, preferably directly during casting. They are implemented in such a way that they do not interfere with a cylinder, called the support cylinder, the base of which is equal to the support surface (16) over the full height of the pillar. They are substantially vertical and symmetrical in relation to a transverse plane [YZ] passing through the axes of the fixing holes. Furthermore, the grooves are situated outside a zone 21 having a volume defined by the transverse plane and extending symmetrically in the direction X, said zone contributing to the fatigue resistance of the bearing cap. This zone extends over a length e of a few millimeters on each side of said transverse plane. The profile of the grooves is defined by the profile of the recess formed in the pillar as shown in a top view of a horizontal section. The support cylinder and said volume form a safety volume. The profile of the grooves, which are symmetrical with respect to the transverse axis, also allows the manufacturing process to be made more reliable.

The groove preferably starts from the base of the pillar and extends over at least a portion of the height of the pillar. In this way a surface is opened up at the base of said pillar on the base portion. The groove may also be continued in a substantially straight line up to the upper surface 18 of the pillar, following a slope included between the vertical Z and the line of inclination of the outer lateral surface of the pillar, in such a way that its profile does not interfere with the safety volume.

The profile of the groove varies from the base of the pillar to an upper end of the groove. The depth of said groove may vary, for example, from a lower end to an upper end of the groove.

Figure 6:
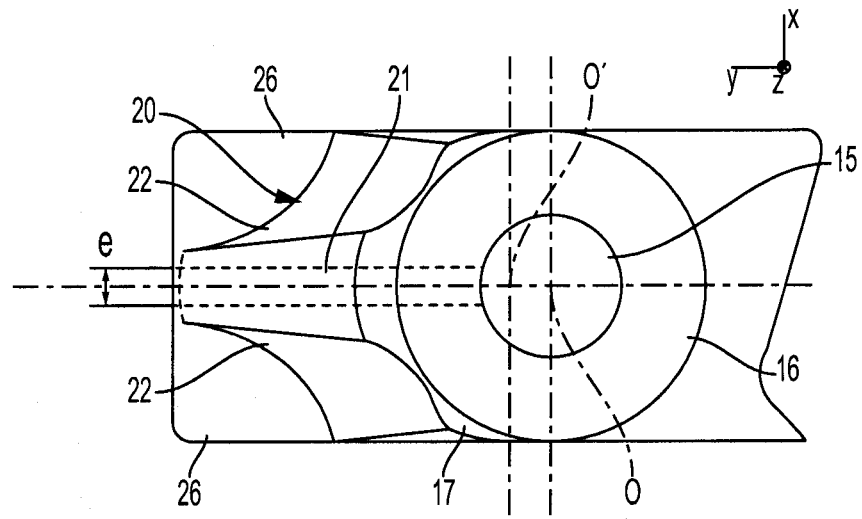
FIGS. 6 and 7 are top views of an end of the bearing cap according to two different embodiments of the invention.

FIGS. 5 and 6 show a profile of the grooves 22 which forms substantially an arc of a circle. The profile of the groove in a horizontal plane does not interfere with the projections of the safety volume in said horizontal plane. The groove 22 is produced in the rough casting through the addition on the outer sand mold (not shown) of a substantially semi-cylindrical boss over at least a portion of the height of the pillar.

Figure 7:
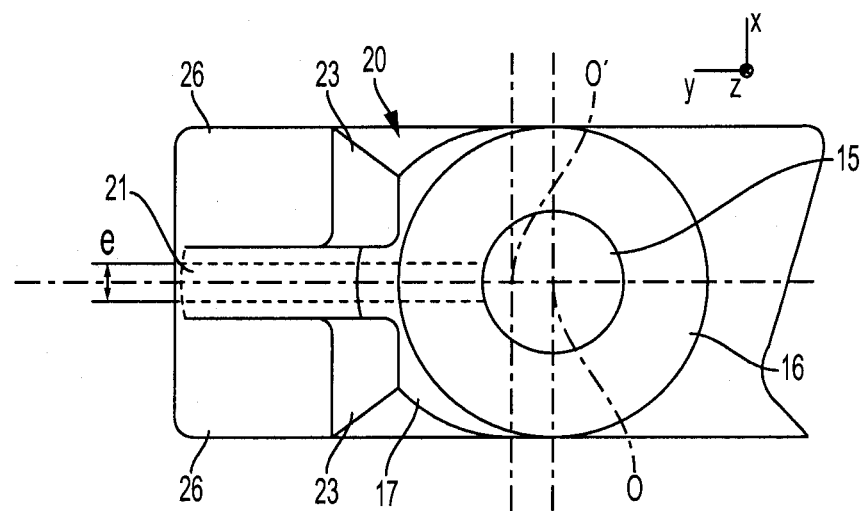

FIG. 7 shows a profile of the grooves 23 having a squared corner, the profile being included, in a horizontal plane, between a longitudinal segment and a transverse segment and the two segments being formed such that their intersection does not interfere with the projections of the safety volume in said horizontal plane. This groove profile corresponds to a major reduction in the mass of the pillars 20 while improving the fatigue resistance of the bearing caps which include these pillars. The groove 23 is produced in the rough casting by the addition, on the outer sand mold (not shown), of a substantially square-cornered boss over at least a portion of the height of said pillar 20.

The bearing caps must conform to fatigue resistance thresholds. The fatigue resistance of the bearing caps depends on the profile of the connecting zone 33 between the crown of the bearing cap and the pillar of said cap, and on the profile of said pillar. Several documents, including those published by Techniques de l'Ingénieur (BM 5 044-2 Méthode VDI) and by the Conférence des Journées de la Fonderie, Strasbourg 19 Sep. 2005, set forth calculations of a fatigue safety factor (FSF) of castings based on fatigue limits and on dispersions of the material forming them. The fatigue safety factor over a large number of cycles allows the fatigue resistance of the part to be characterized for a given material. The higher said value, the better the fatigue resistance of the part. Bearing caps having pillars without grooves and pillars with grooves according to the invention are compared in terms of said factor. This factor shows an improvement from a value of 1.25 for a pillar without grooves to 1.27 for a pillar with grooves according to the profiles previously described. The removal of material from the pillars therefore also improves the fatigue resistance of the bearing cap. This result runs counter to the hypothesis according to which a reduction in the mass of the pillar may lead to degradation of the mechanical performance of the bearing cap, in particular of its fatigue resistance.

The invention allows the mass of the pillar of a crankshaft bearing cap to be optimized. The pillar according to the invention is in the form of a column with an oblong upper surface. Said column includes grooves which contribute to reducing the mass of the pillar as well as improving the fatigue resistance of the bearing cap, in addition to respecting the rules described in the publication FR2878588.

The invention is not limited to the embodiments presented above. Other groove profiles may be obtained directly by casting, with the aim of reducing the mass of the pillars and of the bearing cap while preserving, and indeed improving, the fatigue resistance of said pillars. The profile may be, for example, trapezoidal.

The invention claimed is:

1. A crankshaft bearing cap which has a semi-cylindrical form, which has an axis X coinciding with an axis of the crankshaft, and comprising:

diametrically opposed column-shaped fixing pillars, each column-shaped fixing pillar resting on a base portion and including an upper surface that integrates a circular support surface surrounding a through-hole, through which a fixing screw can pass, with a secondary surface for supporting a screw head, the secondary surface being a circle with two grooves removed from the circle, a center of the secondary surface being located within the through-hole formed in the support surface such that a portion of the secondary surface overlaps the support surface, the two grooves being removed from a portion of the secondary surface that does not overlap the support surface, a radius of the support surface being a same distance as a radius of the secondary surface in a direction of the axis X, and the secondary surface being offset from the support surface in a direction of an axis Y, wherein the grooves extend from the upper surface along an outer lateral surface of the pillar to where the pillar meets the base portion, the grooves being disposed outside a vertical support cylinder having a base equal to the support surface, and outside a volume defined by a transverse plane passing through axes of the fixing holes and extending symmetrically in a direction parallel to the axis X over a length.

2. The crankshaft bearing cap as claimed in claim 1, wherein a profile of the grooves is symmetrical with respect to a transverse axis.

3. The crankshaft bearing cap as claimed in claim 2, wherein the profile of the grooves varies from their lower end to their upper end.

4. The crankshaft bearing cap as claimed in claim 3, wherein the profile of the grooves forms an arc of a circle.

5. The crankshaft bearing cap as claimed in claim 4, wherein the grooves are produced on the outer lateral surface of the pillar during casting of the bearing cap.

6. An internal combustion engine comprising a crankshaft supported on its axis of rotation by bearings and bearing caps as claimed in claim 1.

7. The crankshaft bearing cap as claimed in claim 1, wherein the base portion is positioned below the grooves in a direction of an axis Z of the cap, the axis Z being perpendicular to the axis X.

8. The crankshaft bearing cap as claimed in claim 7, wherein the base portion extends further outward in a direction of the axis Y than the grooves, the axis Y being perpendicular to the axis Z and the axis X.

* * * * *